Nov. 1, 1932.  W. W. REECE ET AL  1,885,142
METHOD OF COOLING BAKERY PRODUCTS
Filed July 24, 1931
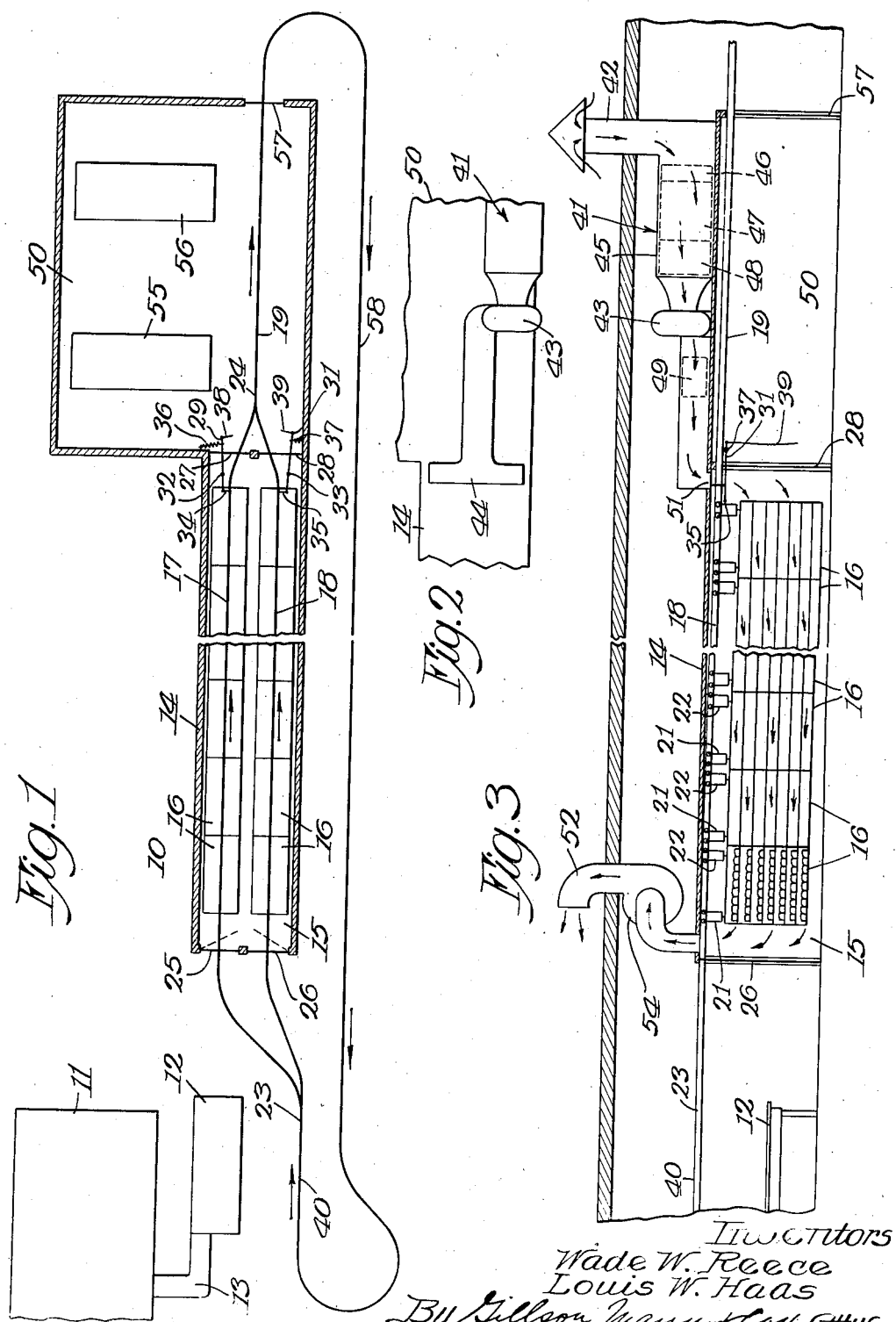

Patented Nov. 1, 1932

1,885,142

UNITED STATES PATENT OFFICE

WADE W. REECE AND LOUIS W. HAAS, OF CHICAGO, ILLINOIS, ASSIGNORS TO THE W. E. LONG CO., A CORPORATION OF ILLINOIS

METHOD OF COOLING BAKERY PRODUCTS

Application filed July 24, 1931. Serial No. 552,912.

This invention relates to apparatus for and method of treating bakery products, and more particularly to an apparatus for and system of conditioning the air employed in cooling said products.

One of the objects of the invention is the provision of new and improved means for treating freshly cooked bakery products with conditioned air for standardizing the cooling and conditioning of those products before wrapping the same.

Another object of the invention is the provision of a new and improved means for controlling the treatment of bakery products preparatory to wrapping the same after the baking operation.

A further object of the invention is the provision of new and improved mechanism for handling and treating the products during the cooling period or cooling operation.

Another object of the invention is the provision of a new and improved apparatus for conditioning bakery products by cleaning, sterilizing and reducing the air to a predetermined temperature and moisture content preparatory to using the same in the cooling operation.

A still further object of the invention is the provision of a system of and apparatus for treating bakery products after the baking operation preparatory to delivering the same to the trade, that may be readily installed and economically and efficiently operated.

Other and further objects and advantages of the invention will appear from the following description taken in connection with the accompanying drawing, in which Fig. 1 is a plan view of a portion of a bakery shown more or less diagrammatically, with parts in horizontal section;

Fig. 2 is a top plan view thereof, with parts broken away; and

Fig. 3 is a longitudinal vertical section of the cooling and wrapping chambers.

It is common practice in the treatment of bakery products to cool the same at room temperature which, in cooling bread for instance, takes from one to four hours, depending of course on the temperature of the surrounding atmosphere, the draft to which the products are subjected, the humidity of the air, the shape or form of the containers, and the like.

This system of cooling bakery products is objectionable for various reasons. During the cooling operation the products are subjected to such varying conditions that a product of uniform size, weight and quality is almost impossible. If the air is very dry excessive evaporation of the products results, and, in the case of bread, the crust will become dry and hard and will crack, thereby becoming less salable. Excessive evaporation, too, will result in undue shrinkage and unnecessary loss of weight.

The most serious objection, however, to cooling bakery products in the open, is from mold contamination or germ infection.

The present invention seeks to remedy these defects by the provision of new and improved means for and system of cooling bakery products whereby uniformity in the length of time necessary to cool the product is obtained; the conditions of cooling are under control; and the resultant products are not only uniform in size, weight and quality, but mold contamination is eliminated entirely or reduced to a minimum. As a result of such treatment a maximum amount of the products can be produced at a minimum of cost, and the products are more edible and find a readier sale.

Referring now to the drawing, the reference character 10 designates generally a bakery plant, 11 the baking ovens therefor, 12 the bread receiving table, and 13 a chute for delivering the bread from the oven to the table 12. Since these features constitute no part of the invention it is not thought necessary to further illustrate or describe the same.

Arranged adjacent to the table 12 is a cooling chamber 14 which may be of any convenient construction, that shown comprising a comparatively long and relatively narrow chamber 15 having a passage therethrough through which the bread is conducted during the cooling operation. Suitable cooling racks 16 are provided for conducting the bread through the cooling chamber. These racks are of the ordinary construction for supporting the bakery products in cooling position.

Suitable means are provided for conducting the racks through the cooling chamber. In the form of construction shown, these racks are supported on tracks extending longitudinally of the cooling chamber. These tracks may support and guide the racks in any manner well known in the art. Any suitable number of tracks may be used. For the purpose of illustrating the invention a pair of tracks 17 and 18 extending through the cooling room are provided. These tracks converge at each end of the cooling room into a single track 19 and form therewith a continuous track on which the racks are supported by suitable hangers 21 and 22.

Appropriate means are provided for causing the racks to move automatically through the cooling chamber 14. In the present instance, this is accomplished by arranging the tracks 17 and 18 so that they incline downwardly from their junction at 23 to their junction at 24.

The rear end of the cooling chamber 14 is provided with a pair of swinging doors 25 and 26 which are adapted to be operated automatically by the racks coming in contact therewith after they leave the junction 23. These doors are so arranged that they will be opened by the racks and will automatically close when the rack has passed through the doorway. The forward end of the chamber is also provided with a pair of swinging doors 27 and 28 which swing outwardly and are adapted to be operated in the same manner as the doors 25 and 26.

Suitable means are provided for holding the racks at a predetermined position in the cooling chamber and for releasing them as desired. As shown, a pair of levers 29 and 31 are employed for this purpose. These levers are pivoted as at 32 and 33 and have their inner ends provided with lateral extensions or stops 34 and 35 which are adapted to be projected across in front of the hangers 22 for arresting the movement thereof. The stops 34 and 35 are normally held across the tracks 17 and 18 by springs 36 and 37. The levers 29 and 31 are provided with cords or the like 38 and 39 whereby they may be manually operated for releasing the racks.

Suitable means are provided for conditioning the air supplied to the cooling chamber for cooling the products. This means is so constructed that it will cause a current of air to flow counter to the movement of the racks through the cooling chamber 14.

In the form of construction disclosed, which is by way of example only, an air passage designated generally by the reference character 41 is provided for conducting air from a point exterior of the chamber, usually extending above the building as shown at 42 to the cooling chamber. A suitable fan 43 is provided in the passage 41 for causing the air to flow through said passage. The inner end of the passage 41 is extended laterally as at 44 to substantially the same width as the chamber. The passage is enlarged as at 45 for accommodating an air cleaner 46, a temperature control device 47 and a humidifier 48. These devices are of any suitable commercial type and while they are shown as being separate and distinct, two or more may be united in a single unit as is usual in such constructions. Since the specific mechanism for cleaning, humidifying and regulating the temperature of the air constitutes no part of the present invention it is not thought necessary to illustrate or describe the same, as any appropriate commercial type may be employed.

Suitable means are also provided for sterilizing the cleaned or washed air before it is delivered to the cooling chamber 14. This device is shown diagrammatically at 49 and may be of any commercial form for treating the air with ultra violet ray, ozone or the like. The conditioned air is delivered through a suitable opening 51 into the cooling chamber 14 and is forced rearwardly through said chamber by the fan 43 which maintains the pressure within said chamber at slightly superatmospheric pressure. A discharge conduit 52 is provided at the rear of the cooling chamber for discharging the air. A blower or discharge fan 54 may be provided in the discharge conduit 52 if necessary or desirable.

From the cooling room the racks pass into the slicing and wrapping room 50 where the product is wrapped or, as in the case of bread, where it may be sliced and then wrapped. The wrapping mechanism is indicated diagrammatically at 55 and 56. It is desirable that the bread be wrapped immediately after it has been treated with sterilized air in order to prevent mold contamination. In the construction shown, this is accomplished in an adjoining room in order that the product may not come in contact with air that has not been sterilized. Since the cooling chamber 14 is maintained at a slightly superatmospheric pressure the leakage around the doors and while the racks are moving through the doors into the wrapping room 50 is such as to supply sufficient air to the operators in the wrapping room and also to maintain the air therein in sterilized condition.

From the wrapping room the racks pass outwardly through a swinging door 57 on to the exterior portion 58 of the track 19.

In the operation of the apparatus the bread, for instance, is delivered from the ovens to the table 12 where it is loaded onto the racks that are delivered one by one to what may be termed the loading station indicated by the reference character 40 in Fig. 1. When they are loaded they are pushed alternately onto the inclined tracks 17 and 18. They move by gravity down these tracks through the swinging doors 25 and 26 into contact with the preceding racks.

They advance as the racks at the forward end of the cooling chamber 14 are released alternately by the levers 29 and 31. They are released at predetermined intervals from the cooling room. The interval will depend on the number of racks within the chamber. It is so arranged that the bread will be cooled to a uniform temperature in passing through the chamber 14. The temperature of the air, the moisture content, etc., are so adjusted that the bread emerges from the chamber 14 at the proper temperature, the proper moisture content, and with no mold contamination.

As the racks are released alternately from first the track 17 and then the track 18 they pass into the wrapping room 50 which may be an adjoining room, as shown, or a room adjacent to the cooling room where the bread is wrapped or sliced and wrapped as the case may be. When the product is wrapped and placed back on the racks 16 the racks are pushed through the swinging door 57 onto the exterior portion 58 of the track 19 from whence it is prepared for delivery or shipment.

We claim as our invention:

1. The process of cooling bakery products which consists in conducting the unwrapped products directly from the baking oven into one end of and through a cooling passage in one direction, and conducting a stream of air having a predetermined moisture content and at a pre-determined temperature into the opposite end only of said passage and causing the same to flow therethrough in a direction counter to the movement of said products and to discharge from the said one end of the passage for cooling said products without substantial loss of weight, and then immediately wrapping said products while subject to the conditioned air and before exposure to atmospheric air.

2. The process of cooling bakery products which consists in conducting the unwrapped products from the baking oven while still hot into one end of and through a cooling passage in one direction, and conducting a stream of sterilized air having a pre-determined moisture content and at a pre-determined temperature into the opposite end only of said passage and causing the same to flow therethrough in a direction counter to the movement of said products and to discharge from the said one end of the passage for cooling the said products without materially affecting their weights, and then immediately wrapping said products while in the sterilized air and before exposure to atmospheric air.

3. The process of cooling bakery products which consists in introducing the unwrapped product while still hot from the baking operation into one end of a cooling passage, conducting the same along said passage in one direction, conducting cooled air into the opposite end only of said passage and causing the same to flow along said passage in a direction counter to the direction of travel of said product and discharging said air into the atmosphere at the opposite end of said passage, thereby producing products of uniform size and weight.

4. The process of treating bakery products which consists in subjecting the same while still hot from the baking operation and while unwrapped to an atmosphere of sterilized air below a pre-determined temperature suitable for cooling said products for a pre-determined period of time for sterilizing and cooling said products, and then wrapping said products while in the sterilized air and before the same becomes contaminated by foreign matter in the atmosphere.

5. A process of treating bakery products which consists in subjecting the same immediately after they come from the oven and while unwrapped to a current of sterilized air of a pre-determined temperature below that of the products and containing a pre-determined proportionate amount of moisture, and immediately thereafter wrapping the same while in the sterilized air and before exposure to the atmosphere to prevent loss of weight and contamination of said products from the atmosphere.

6. A process of treating bakery products which consists in subjecting said products while unwrapped and immediately after they come from the oven to a draft of air at a pre-determined temperature suitable for cooling said products, and having a moisture content such as to prevent substantial shrinkage of said products during the cooling operation, and immediately thereafter wrapping the same while in the said air and before exposure to atmospheric air to prevent evaporation of the moisture content of the cooled product and the consequent shrinkage thereof.

7. The herein described method, which comprises enveloping freshly cooked and hot bakery products in sterilized air of predetermined low temperature and predetermined moisture content such as will uniformly cool the products and maintain them at predetermined size, weight and moisture content, and wrapping the treated products when cooled to predetermined temperature and while enveloped in the sterilized air and before exposure to atmospheric air.

8. The herein described method, which comprises providing a stream of sterilized air of predetermined low temperature and predetermined moisture content, conducting freshly cooked and hot bakery products through the stream of air in a direction reverse to the flow thereof until the products have become cooled to predetermined temperature, then removing the cooled products from the stream of air while maintaining them enveloped in sterilized air, and then wrapping the treated products while in the sterilized air and before exposure to atmospheric air.

9. The herein described method, which comprises flowing conditioned air in a stream into one end portion of a closed passage, through the passage and out at the opposite end portion thereof, conducting freshly cooked and hot bakery products into, through and out of the passage and in a direction counter to that of the flow of the air and through the stream of air so as to be enveloped thereby, discharging the products from the passage directly into a chamber containing conditioned air without exposing the products to atmospheric air, wrapping the products while in the chamber and enveloped in conditioned air and before exposure to atmospheric air, and then discharging the wrapped products from the chamber.

10. The herein described method of treating bakery products, which comprises providing a current of conditioned air in a closed passage, feeding unwrapped bakery products through the passage in contact with the conditioned air and in a direction counter to that of the flow of said air, and then wrapping the products while in conditioned air and before exposure to atmospheric air.

11. The herein described method of treating bakery products, which comprises subjecting unwrapped bakery products in a closed chamber to a current of conditioned air for cooling said products and then wrapping the products while in conditioned air and before exposure to atmospheric air after the cooling operation.

12. The process of treating bakery products which comprises introducing the unwrapped product while still hot from the baking operation into one end of a conditioning passage, conducting the unwrapped product along said passage in one direction, conducting air conditioned as to temperature and moisture into the opposite end only of said passage, and causing the same to flow along said passage in a direction counter to the direction of travel of said product and discharging said air at the opposite end of said passage, thereby cooling and producing products of uniform size and weight.

13. The herein described method, which comprises flowing air conditioned as to temperature and moisture in a stream into one end portion only of a closed passage, through the passage and out at the opposite end portion thereof, and conducting freshly cooked and hot bakery products immediately from the oven into, through and out of the passage and in a direction counter to that of the flow of the air and through the stream of air so as to be enveloped by said air, thereby cooling and producing products of uniform size and weight.

In testimony whereof we affix our signatures.

WADE W. REECE.
LOUIS W. HAAS.